United States Patent
Harrison et al.

(10) Patent No.: US 11,519,851 B2
(45) Date of Patent: Dec. 6, 2022

(54) MONITORING OF COMPOUNDS

(71) Applicant: C Technologies Inc., Bridgewater, NJ (US)

(72) Inventors: Craig Harrison, Bridgewater, NJ (US); Ramsey Shanbaky, Bridgewater, NJ (US)

(73) Assignee: C Technologies Inc., Bridgewater, NJ (US)

( * ) Notice: Subject to any disclaimer, the term of this patent is extended or adjusted under 35 U.S.C. 154(b) by 0 days.

(21) Appl. No.: 16/332,527

(22) PCT Filed: Sep. 15, 2017

(86) PCT No.: PCT/US2017/051782
§ 371 (c)(1),
(2) Date: Mar. 12, 2019

(87) PCT Pub. No.: WO2018/053268
PCT Pub. Date: Mar. 22, 2018

(65) Prior Publication Data
US 2019/0212258 A1 Jul. 11, 2019

Related U.S. Application Data

(60) Provisional application No. 62/495,653, filed on Sep. 17, 2016.

(51) Int. Cl.
*G01N 21/33* (2006.01)
*G01N 21/03* (2006.01)
*G01N 21/05* (2006.01)
*B01D 15/20* (2006.01)
*B01D 35/02* (2006.01)
*G01N 30/50* (2006.01)
*G01N 21/27* (2006.01)
*G01N 30/74* (2006.01)
(Continued)

(52) U.S. Cl.
CPC ............. *G01N 21/33* (2013.01); *B01D 15/20* (2013.01); *B01D 35/02* (2013.01); *B01D 65/10* (2013.01); *G01N 21/0303* (2013.01); *G01N 21/05* (2013.01); *G01N 21/272* (2013.01); *G01N 30/50* (2013.01); *G01N 30/74* (2013.01); *G01N 30/88* (2013.01); *B01D 57/02* (2013.01); *B01D 61/20* (2013.01); *G01N 21/0317* (2013.01); *G01N 27/44721* (2013.01); *G01N 30/466* (2013.01); *G01N 2021/1748* (2013.01); *G01N 2030/8886* (2013.01)

(58) Field of Classification Search
None
See application file for complete search history.

(56) References Cited

U.S. PATENT DOCUMENTS

| 5,770,156 A * | 6/1998 | Dosoretz | G01N 21/03 356/434 |
| 2008/0087836 A1* | 4/2008 | Knight | G01N 21/33 250/372 |

(Continued)

*Primary Examiner* — Edwin C Gunberg
(74) *Attorney, Agent, or Firm* — KDB Firm PLLC (57) ABSTRACT

The present invention relates to methods for determining the change in concentration of a substance in solution over time by continuously monitoring in real time. In particular, the present invention relates to methods for continuously monitoring the concentration of compounds during the manufacturing process of biomolecules.

23 Claims, 9 Drawing Sheets

(51) Int. Cl.
*G01N 30/88* (2006.01)
*B01D 65/10* (2006.01)
*B01D 57/02* (2006.01)
*G01N 27/447* (2006.01)
*G01N 30/46* (2006.01)
*B01D 61/20* (2006.01)
*G01N 21/17* (2006.01)

(56) References Cited

U.S. PATENT DOCUMENTS

2013/0280788 A1* 10/2013 Skudas ............... G01N 30/468
  435/238
2017/0108481 A1* 4/2017 Chen .................. G01N 21/31
2018/0339244 A1* 11/2018 Hubbuch ............. G01N 30/74

* cited by examiner

MONITORING OF COMPOUNDS

FIELD OF THE INVENTION

The present invention relates to methods for determining the change in concentration of a substance in solution over time by continuously monitoring in real time. In particular, the present invention relates to methods for continuously monitoring the concentration of compounds during the manufacturing process of biomolecules.

BACKGROUND OF THE INVENTION

Monitoring and control of manufacturing processes is important in all industries, but especially in the case of biotechnology processes. Biotechnology processes are used to produce a large variety of products such as proteins, cells, tissues, carbohydrates and vaccines. Monitoring of the manufacturing process may be accomplished by in situ analysis, off line monitoring or online monitoring. Biomanufacturing processes are time consuming and usually performed in a batch mode. Continuous processing for each individual chromatography step let alone the entire manufacturing process has not yet been accomplished in a commercial process. This is partially due to the fact that samples would need to be taken at each stage of the process and then analyzed in order to ensure the efficiency of the process. The analysis of these samples would provide information that would enable the adjustment of process parameters between each step of the manufacturing process.

Currently, many of the sensors required to control the manufacturing process of biologics are available and accurate except the UV absorbance sensor (at 280 nm). Even at very small path lengths the UV sensors become saturated during the process thereby providing process operators with little or no information. This means process decisions that are made by the UV absorbance trace can only be done in the linear region of the sensor.

To circumvent this problem a surrogate wavelength of light such as 300 nm may be used, and in all cases a large effort is taken in the process development stage of a molecule to characterize this process such that a reading at 280 nm is not necessary at larger scales. This does not guarantee that problems may not occur during the process, and in fact the A300 values are not necessarily indicative of the A280 values. With batch costs in the millions of dollars, a lost batch due to a bad sensor is an unacceptable risk. During process development samples need to be taken across 30+ points at each stage of the process and analyzed for UV absorbance among other things. This step needs to be repeated many times for a single molecule at each phase of the development process.

Purification development accounts for 1-3% of the total R&D costs of a biomolecule development. For the top 12 companies, this amounts to approximately $750M-$2.2B in development costs per drug. Reducing the process development timeline, even slightly, would be of great value to industry. A direct measurement at 280 nm of the protein concentration throughout the process can reduce sampling time significantly, allow for continuous processing schemes and potentially indicate product purity during all stages of the process.

Naughton et al. U.S. Pat. No. 6,395,538 describes the use of infrared spectroscopy for in situ biomanufacturing process monitoring and control.

Therefore, there exists a need for a method to determine the presence of particular substances in a complex mixture of compounds simply and without purification, modification or dilution.

SUMMARY OF THE INVENTION

The present invention relates to methods of determining the change in concentration of a substance in solution over time by continuously monitoring in real time the spectrum of the substance by detecting the spectrum in a flow through mechanism having a light source, a path length and a detector in which the path length is altered such that multiple measurements of the spectrum are made at different path lengths and then comparing the concentration of the substance over time. By having the concentration signal in real-time along with other process parameters, biomolecule mass can be determined in real-time. The present invention provides for monitoring the concentration of the substance at more than one location, including but not limited to at the input and at the outflow of the solution. Various substances can be monitored including but not limited to surfactants, biomolecules, proteins, cells and virus particles, small molecules, peptides or conjugated proteins.

The present invention relates to methods of determining the change in concentration of a substance in solution over time by continuously monitoring in real time the spectrum of the substance where the change in concentration of the substance is due to the solution being subjected to one or more purification processes including but not limited to precipitation, filtration, electrophoresis, chromatography separation, chemical reactions and combinations thereof. Chromatographic separation may be anion exchange chromatography, cation exchange chromatography, gel filtration chromatography, hydrophobic interaction chromatography and affinity chromatography.

The present invention relates to methods of determining the change in concentration of a substance in solution over time comprising monitoring in real time the ultraviolet spectrum of the substance at discrete time points by detecting the spectrum in a flow through mechanism comprising a light source, a path length and a detector in which the path length is altered such that multiple measurements of the spectrum are made at different path lengths at the discrete time points and comparing the concentration of the substance at the discrete time points.

The present invention relates to methods of determining the lifetime of a membrane used in ultrafiltration by continuously monitoring in real time the concentration of a substance in a solution that has passed through the ultrafiltration membrane by detecting the ultraviolet spectrum of the substance in a flow through mechanism comprising a light source, a path length and a detector in which the path length is altered such that multiple measurements of the spectrum are made at different path lengths and comparing the concentration of the substance over time.

The present invention relates to methods of determining the binding capacity of a chromatography resin by continuously monitoring in real time the concentration of a substance in a solution that has passed through the resin by detecting the ultraviolet spectrum of the substance in a flow through mechanism comprising a light source, a path length and a detector in which the path length is altered such that multiple measurements of the spectrum are made at different path lengths and comparing the concentration of the substance over time.

The present invention relates to methods of controlling a biomanufacturing process for a biomolecule by detecting a ultraviolet spectra in situ and in real-time of the biomolecule during at least one stage of the biomanufacturing process where the ultraviolet spectra characterizes a fingerprint of the biomolecule and generating at least one control signal in response to the detected ultraviolet spectra wherein the at least one signal enables a control step in the biomanufacturing process.

The present invention relates to methods of fingerprinting a biomolecule whereby the biomolecule spectra may be compared to a calibration curve to determine the identity of the biomolecule solution.

DETAILED DESCRIPTION OF THE INVENTION

Spectroscopic analysis is a broad field in which the composition and properties of a material in any phase, gas, liquid, solid, are determined from the electromagnetic spectra arising from the interaction (eg. absorption, luminescence, or emission) with energy. One aspect of spectrochemical analysis, known as spectroscopy, involves interaction of radiant energy with the material of interest. The particular methods used to study such matter-radiation interactions define many sub-fields of spectroscopy. One field in particular is known as absorption spectroscopy, in which the optical absorption spectra of liquid substances are measured. The absorption spectra is the distribution of light attenuation (due to absorbance) as a function of light wavelength. In a simple spectrophotometer the sample substance which is to be studied is placed in a transparent container, also known as a cuvette or sample cell. Electromagnetic radiation (light) of a known wavelength, $\lambda$, (ie. ultraviolet, infrared, visible, etc.) and intensity (I) is incident on one side of the cuvette. A detector, which measures the intensity of the exiting light, I is placed on the opposite side of the cuvette. The length that the light propagates through the sample is the distance d. Most standard UV/visible spectrophotometers utilize standard cuvettes which have 1 cm path lengths and normally hold 50 to 20004 of sample. For a sample consisting of a single homogeneous substance with a concentration c, the light transmitted through the sample will follow a relationship know as Beer's Law: $A=\varepsilon c l$ where A is the absorbance (also known as the optical density (OD) of the sample at wavelength $\lambda$ where OD=the $-\log$ of the ratio of transmitted light to the incident light), $\varepsilon$ is the absorptivity or extinction coefficient (normally at constant at a given wavelength), c is the concentration of the sample and l is the path length of light through the sample.

Spectroscopic measurements of solutions are widely used in various fields. Often the compound of interest in solution is highly concentrated. For example, certain biological samples, such as proteins, DNA or RNA are often isolated in concentrations that fall outside the linear range of the spectrophotometer when absorbance is measured. Therefore, dilution of the sample is often required to measure an absorbance value that falls within the linear range of the instrument. Frequently multiple dilutions of the sample are required which leads to both dilution errors and the removal of the sample diluted for any downstream application. It is, therefore, desirable to take existing samples with no knowledge of the possible concentration and measure the absorption of these samples without dilution.

An approach to the dilution problem is to reduce the path length in making the absorbance measurement. By reducing the measurement path length, the sample volume can be reduced. Reduction of the path length also decreases the measured absorption proportionally to the path length decrease. For example, a reduction of path length from the standard 1 cm to a path length of 0.2 mm provides a virtual fifty-fold dilution. Therefore, the absorbance of more highly concentrated samples can be measure within the linear range of the instrument if the path length of the light travelling through the sample is decreased. There are several companies that manufacture cuvettes that while maintaining the 1 $cm^2$ dimension of standard cuvettes decrease the path length through the sample by decreasing the interior volume. By decreasing the interior volume less sample is required and a more concentrated sample can be measured within the linear range of most standard spectrophotometers. While these low volume cuvettes enable the measurement of more concentrated samples the path length within these cuvettes is still fixed. If the sample concentration falls outside the linear range of the spectrophotometer the sample still may need to be diluted or another cuvette with an even smaller path length may be required before an accurate absorbance reading can be made.

While some of these instruments provide the capability of varying the path length for measurement of highly concentrated low volume samples the applications described therein relate primarily to single path length and single wavelength measurements. Several of the instruments provide a limited number of path lengths and all are limited to path length larger than 0.2 mm. Furthermore, the devices and methods of the prior art do not provide for expanding the dynamic range of the spectrophotometer so that it is not necessary to adjust the concentration of the sample to fall within the linear range of absorbance detection of the instrument. To the extent that the prior art teaches shorter path lengths to determine the concentration of very concentrated samples or low volume samples the focus of these devices is to take a single absorbance reading at a single path length. As such the prior art references require that the path length be known with great accuracy so that an accurate concentration measurement can be made.

Figure 1:
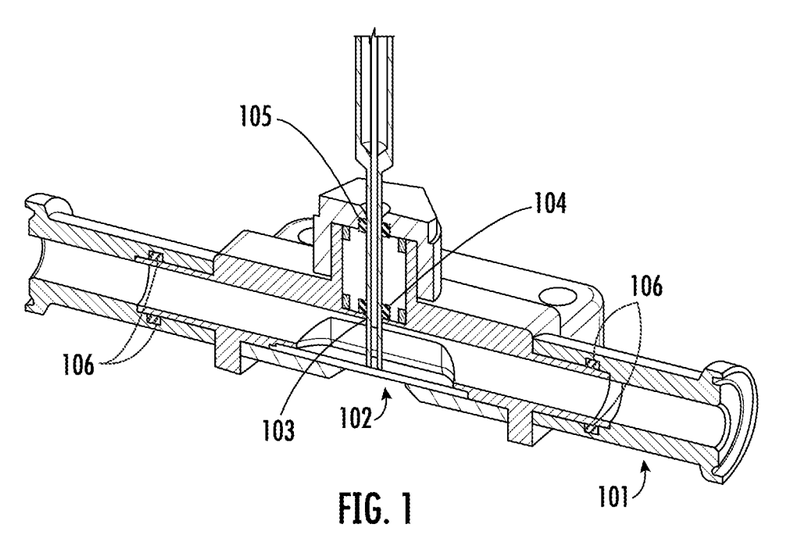
FIG. 1 is a schematic diagram of one embodiment of the flow cell used in the methods and devices of the present invention.

The present invention provides devices and methods that provide a variable path length spectrophotometer which dynamically adapts parameters in response to real time measurements via software control to expand the dynamic range of a conventionally spectrophotometer such that samples of almost any concentration can be measured without dilution or concentration of the original sample. Furthermore, certain methods of the present invention do not require that the path length be known to determine the concentration of samples. This and other objects and advantages of the invention, as well as additional inventive features, will be apparent from the description of the invention provided herein. FIG. 1 is a schematic of a flow-through device which may serve as a sample vessel in the instruments of the present invention. The flow-through device comprises a flow cell body (101) that permits the flow of a sample solution into and out of the flow cell device. The flow cell body has at least one window (102) that is transparent to electromagnetic radiation in the range of electromagnetic source typically 200-1100 nm. The window can be made from various materials but for ultraviolet applications quartz, cyclo olefin polymer (COP), cyclo olefin copolymer (COC), polystyrene (PS) or polymethyl methacrylate PMMA may be required. The window may be of different sizes and shapes so long as the electromagnetic radiation can pass through the window and strike the detector. In a flow-cell system the detector and probe tip may be in a substantially horizontal orientation (FIG. 1) and the sample flows between the detector and the probe. In an alternate embodiment a mirror may be used to reflect the electromagnetic radiation to and through the window. The placement of the mirror and window are not restricted as long as the mirror can reflect the electromagnetic radiation through the window such that the radiation is detected by the detector. In certain embodiments the mirror and the window may be opposite one another or at right angles to each other. Regardless of the absolute spatial orientation of the probe and detector, the probe tip and surface of the detector should be substantially perpendicular relative to one another. The flow cell body also comprises a port (103) through which the probe tip may pass. This port is sealed with a dynamic seal (104) such that the probe tip can pass through the port without sample solution leaking from the flow-through device. Such seals include FlexiSeal Rod and Piston Seals available from Parker Hannifin Corporation EPS Division, West Salt Lake City, Utah. In the diagram there is a single pathway for the sample solution to flow coming in the inlet port and exiting the outlet port. Alternative embodiments may include multiple pathways and multiple inlet and outlet ports. In the embodiment of the flow cell device in FIG. 1, the probe tip moves substantially perpendicular to the flow of the sample solution and is substantially perpendicular to the detector.

The flow cells may have a variety of inside diameters. For example the flow cell may have an inside diameter of 3 mm ID and 10 mm ID. Table 1 lists several different flow cell inside diameters with the flow rate.

TABLE 1

| Flow Cell Inside Diameter (inches [mm]) | Flow Rate (L/min) |
| --- | --- |
| 0.394 [10] | 18 |
| 0.750 [19] | 65 |
| 1.00 [25.4] | 120 |
| 1.250 [31.75] | 188 |
| 1.500 [38.1] | 271 |

The flow cells were tested to determine whether the cells could handle the flow rate and to determine the back pressure caused by the fibrette in the flow path. The pressure drop across the fibrette is about 1.59 psi.

The various flow cell diameters are a function of the volume and flow rate needed during a given process. For volumes in the range of 10s-100s of mL, such as for small lab scale setups, the 3 mm cell is preferred. The 10 mm cell may be used when the total volume reaches the 1 L-100 L scale. Inner diameters for the flow cell can be up to 3 inches with flow rates up to 500 LPM.

The flow cells may be incorporated into the flow stream by various fittings. The 3 mm ID flow cell uses a barb fitting or luer fitting. The 10 mm ID flow cell uses a tri-clamp fitting.

Figure 2:
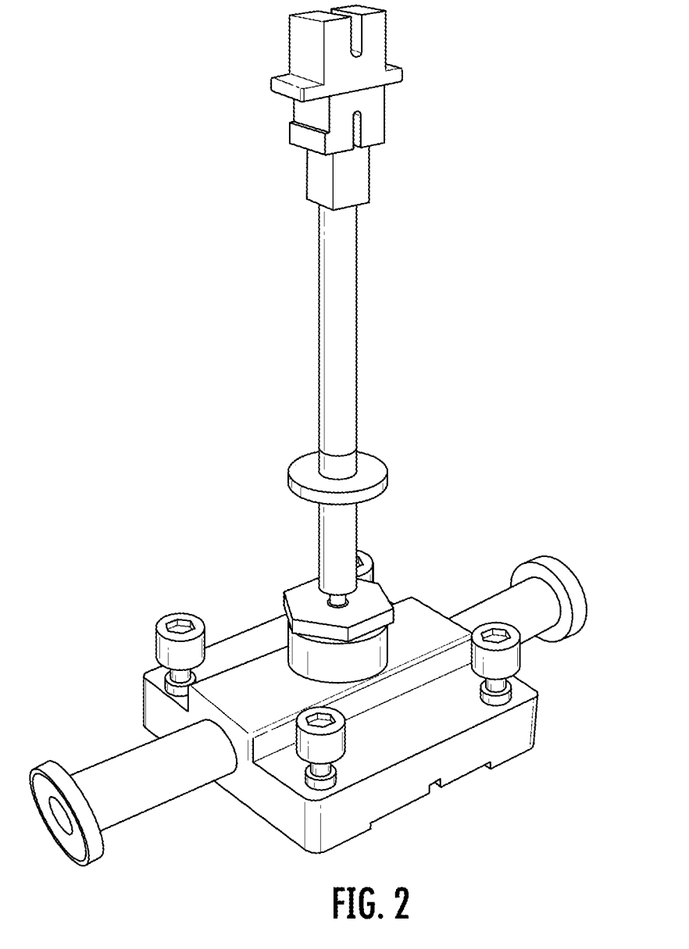
FIG. 2 is a picture of one embodiment of the flow cell used in the methods and devices of the present invention.
Figure 3:
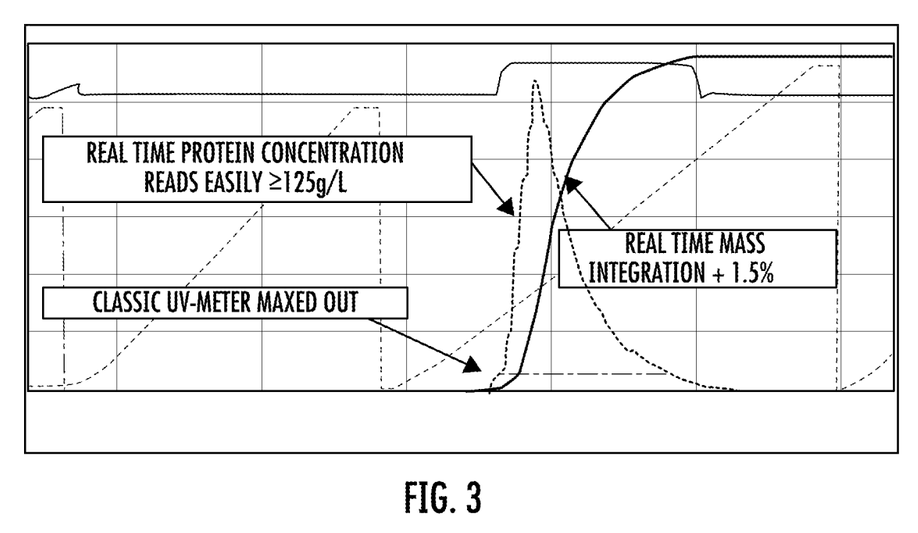
FIG. 3 is a plot of real time mass and yield for a compound using the methods and devices of the present invention.
Figure 4:
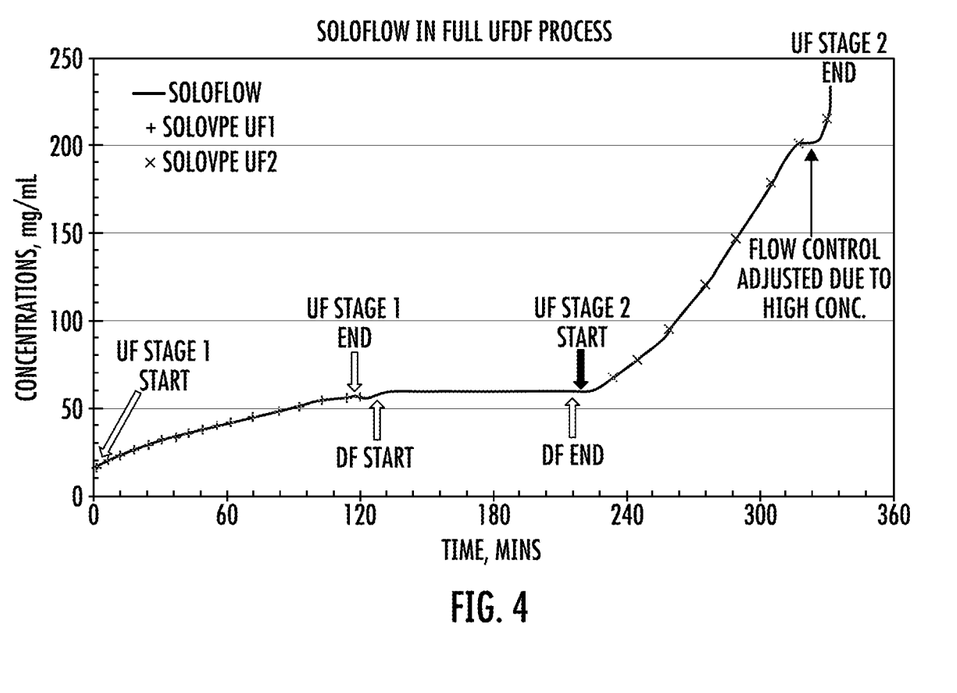
FIG. 4 is a plot of concentration versus time for an ultrafiltration/diafiltration process using the flow cell used in the methods and devices of the present invention.

In a preferred embodiment of the flow cell, the cells are made of stainless steel 316, with a quartz window and a fiber optic encased in stainless. In this preferred embodiment there are 2 teflon seals (104 and 105) on either side of the fibrette that pistons up and down in the flow cell in order to take reading. Alternatively, a gasket fixed to the fibrette and fixed in the flow cell can provide the proper sealing while ensuring accurate path length changes. In preferred embodiments of the flow cell the outer diameter of the fibrette is increased compared to static systems. In preferred embodiments the outer diameter of the fibrette may be less than 1 mm or greater than 25 mm. The size of the fibrette will depend on the application which will influence the size of the flow cell and the rate of the fluid flowing through the flow cell. In preferred embodiments the fibrette is of sufficient diameter so that it will not vibrate, bend or break. The increased outer diameter of the fibrette reduces equipment vibration that impacts the accuracy of the measurement. In a preferred embodiment of the flow cell there is a stainless plug located between the Teflon seals. The plug fills a void in the flow cell that may present a cleaning challenge. With the void filled, the flow cell is more easily cleaned. Other seals (106) in the flow cell may be made with platinum cured silicone. Standard EPDM seals may release some material over time that may contaminate the flow cell and the use of platinum cured silicone avoids this potential issue. The flow cells of the present invention are capable of being sterilized or cleaned such that they may be used in processes where a sterile or aseptic environment is required. FIG. 2 is a picture of one embodiment of the flow cell used in the methods and devices of the present invention.

Detectors comprise any mechanism capable of converting energy from detected light into signals that may be processed by the device. Suitable detectors include photomultiplier tubes, photodiodes, avalanche photodiodes, charge-coupled devices (CCD), and intensified CCDs, among others. Depending on the detector, light source, and assay mode such detectors may be used in a variety of detection modes including but not limited to discrete, analog, point or imaging modes. Detectors can used to measure absorbance, photoluminescence and scattering. The devices of the present invention may use one or more detectors although in a preferred embodiment a single detector is used. In a preferred embodiment a photomultiplier tube is used as the detector. The detectors of the instrument of the present invention can either be integrated to the instrument of can be located remotely by operably linking the detector to a light delivery device that can carry the electromagnetic radiation the travels through the sample to the detector. The light delivery device can be fused silica, glass, plastic or any transmissible material appropriate for the wavelength range of the electromagnetic source and detector. The light delivery device may be comprised of a single fiber or of multiple fibers and these fibers can be of different diameters depending on the utilization of the instrument. The fibers can be of almost any diameter but in most embodiments the fiber diameter is in the range of from about 0.005 mm to about 20.0 mm.

The control software will adapt the devices behavior based upon various criteria such as but not limited to wavelength, path length, data acquisition modes (for both wavelength/path length), kinetics, triggers/targets, discrete path length/wavelength bands to provide different dynamic ranges/resolutions for different areas of the spectrum, cross sectional plot to create abs/path length curves, regression algorithms and slope determination, concentration determination from slope values, extinction coefficient determination, base line correction, and scatter correction. The software is configured to provide scanning or discrete wavelength read options, signal averaging times, wavelength interval, scanning or discrete path length read options, data processing option such as base line correction, scatter correction, real-time wavelength cross-section, threshold options (such as wavelength, path length, absorbance, slope, intercept, coefficient of determination, etc.) an kinetic/continuous measurement options In chromatography, the flow cell may be just downstream of the chromatography column in order to obtain a reading during elution of the column. Alternatively, the flow cell may be placed before and after a chromatography column if a comparison reading is desirable. By getting a reading before and after the column the product titer (or concentration of antibody in the cell culture mixture) can be determined. Using this information product loading parameters can also be determined in real-time. With the product titer and real-time concentration it is possible to create a real-time mass plot which can then be used to further control the chromatography process. In ultrafiltration/diafiltration the flow cell may be placed either on the feed line or the retentate line. Placing the flow cell immediately after a pump may cause problems because of the pulsation of the pump and thus it is desirable to place the flow cell in a position which is not proximate to the pump. In continuous processes, the flow cell may be placed both before and after the ultrafiltration/diafiltration step. For conjugated antibodies, small molecule depletion curves can be created by calculating the drug-to-antibody concentration ratio in real-time in the retentate or the concentration of the drug in the permeate can give an indication of whether free drug is removed. By monitoring off-peak wavelengths in UF/DF and indication of the amount of aggregate, particulate or impurities can also be determined.

The present invention relates to methods of determining the change in concentration of a substance in solution over time by continuously monitoring in real time the spectrum of the substance by detecting the spectrum in a flow through mechanism having a light source, a path length and a detector in which the path length is altered such that multiple measurements of the spectrum are made at different path lengths and then comparing the concentration of the substance over time.

Quantities of substances within fluid samples may be measured intermittently or continuously with various embodiments of the present invention. Continuous measurement of substances in fluid samples is particular advantageous for numerous processes and applications as conditions within the fluid process and quantities or concentrations of substance often change throughout a process and often on short time scales such as several minutes. Fluid processes such as bioprocesses and chemical processes are examples of process where continuous monitoring of substances is advantageous. Embodiments of the present invention are well-suited for performing continuous optical measurements in for example yeast fermentations, bacterial processes, insect cell cultures, mammalian cell cultures, and protein expression processes. In bioprocesses the implementation of methods of the present invention provide for performing measurements in the cell growth stage, the product formation stage, the product purification stage and the product formulation stage. Fluid processes from which the fluid samples to be measured are obtained may be batch processes, semi-continuous processes, continuous processes or perfusion processes. Processes may be monitored in real time. The measurement may be greater than one measurement per minute and each measurement may provide quantification or one or more substances. Continuous monitoring of fluid processes provides not only measurement of substances in the fluid samples with greater time resolution, but also the ability to detect outlier conditions in processes, thus providing a measure of quality control which enables the feedback control of the processes. Such feedback control would permit the adjustment of process to take into account changing process conditions. For example, if the output of a chromatography column were determined to be out of specification by monitoring the output of the column the outflow might be re-routed to another column for re-purification. The methods of the present invention provide for comparing current processes and output to historical information for making decisions as to how to improve or alter the process either after or while the process is running.

Figure 8:
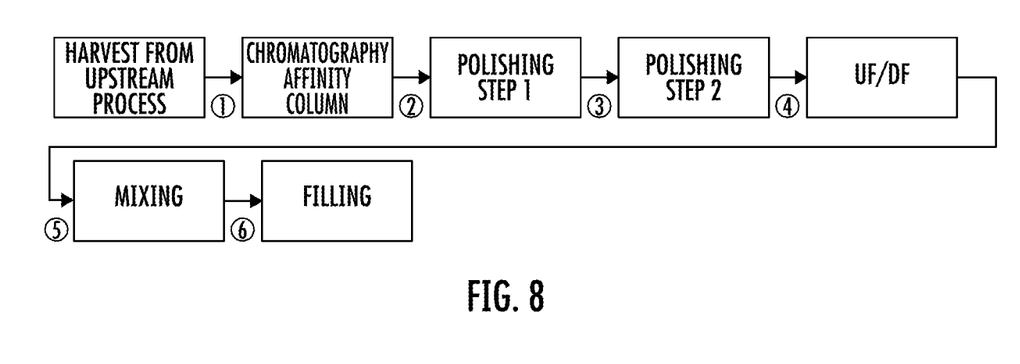
FIG. 8 is a flow diagram of a standard batch process

FIG. 8 is a flow diagram of a standard batch process in which biological materials are present. In a continuous process such as protein purification the one or more flow sensors of the present invention could be utilized at each step of the process or at particular sites in the process. In step 1 of the process the harvest material is a combination of the target protein, host cell proteins, media, DNA and other impurities. A slope signal would give the absorbance contributions of all these components. With characterization it may be possible to use a spectral signal to quantify components. The spectra could be used as a pre-column indicator to compare to a post column slope signal to determine column loading in either a batch or continuous process. Alternatively, using a slope signal before and after the column the product titer can be determined. Once the product titer is compared to the concentration signal a real-time mass during loading can be determined. This allows for the material prior to the column contains the full complement of loading materials. Once the column is loaded the target protein is adsorbed or bound to the column and the material flowing through the column are the impurities from the harvested material. Conversely in an exclusion column would capture the impurities and permit the target material to pass through the column. The second step of the process, after the affinity column, may be the best location to monitor the process. This step is where most of the purification of the substance occurs. A slope signal can be used to see when a column is fully loaded. This may be accomplished by a comparison of the background signal (due to the harvest material alone) as it is flowing past the sensor to a signal at a later time of the harvest material and load material together. This occurs when the resin is loaded to capacity. Alternatively, by having the product titer and real-time concentration, loading on a column can be controlled by mass of total protein loaded. Parameters like pH, flow rate, conductivity, size and configuration of resin, type of resin or temperature may affect the loading capacity. With this slope signal alone, load capacity may be determined quickly and varied experimentally to hone in on ideal process parameters. During a continuous process, there would likely be many affinity columns that would individually be loaded to capacity and then eluted. Long-term comparison of elution peak from column to column could indicate if resin capacity has dropped over time indicating a need to replace a column or other change in the process. The addition of spectral measurements during elution may allow for quantification of individual components present in the solution. Steps 3 and 4 are polishing steps and a slope sensor at each polishing step provides a continuous quantification of the concentration and an overall yield value for the process. Due to the large dynamic range of the flow sensors multiple species can be quantified in ion exchange chromatography separation which otherwise would take offline analysis. In step 5 a sensor after the UF/DF stage gives a concentration value that is the final concentration of the drug substance which has been processed/purified. The concentration can be monitored throughout the process easily without extensive characterization which contrasts other methods like refractive index monitoring. Slope value is in most cases buffer independent. The permeate can also be monitored during normal processing or conjugation. In the final step flow sensor at the filling station will give a final vial concentration. It can be used to capture all remaining material and be used to determine final process yield.

Figure 9:
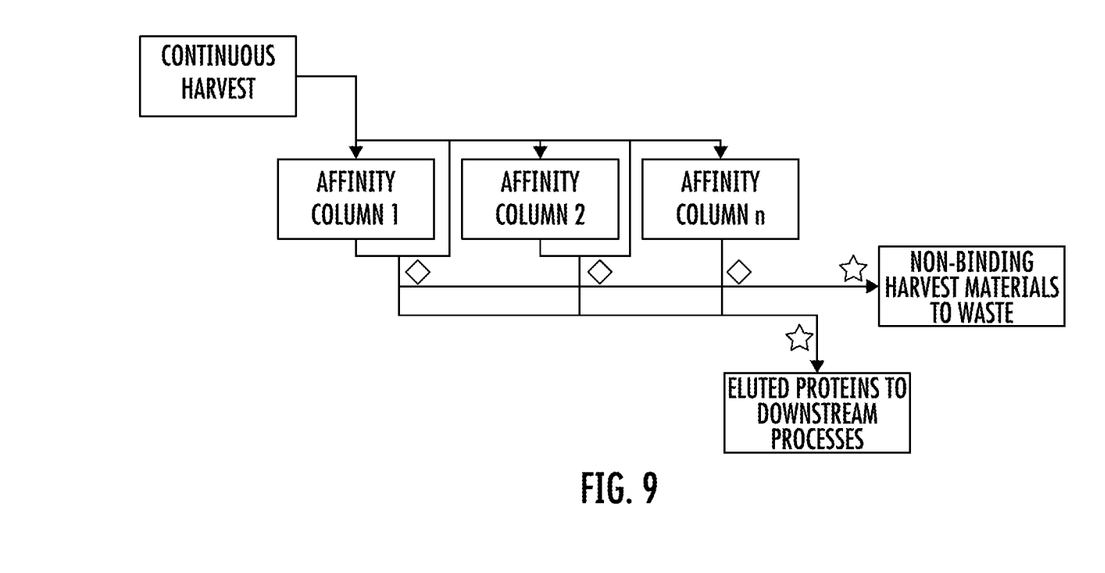
FIG. 9 is a diagram of one example of a continuous chromatography

FIG. 9 is a diagram of a continuous chromatography process highlighting the placement of flow sensors in the process. The stars reference locations where sensors can read the flow through from the columns when loading and when switched to elution mode could quantify the peak of the protein eluted. The diamonds reference locations where sensors may be placed at the outlet of each column, such that maximum loading can be determined for each column. Sensors may be multiplexed such that comparisons of time to load can be made for each column. FIGS. 8 and 9 are illustrations of processes and flow sensor placement and are not meant to be limiting.

Ultrafiltration (UF) and diafiltration (DF) are commonly used as downstream processing steps for product concentration and/or buffer exchange. The basis of both UF and DF processing is filtration with a membrane that retains product and allows non-target molecules (e.g., water, salts, residuals, etc.) to flow through the membrane to waste. UF is most commonly used for concentrating a dilute product stream while DF is most often used to exchange a product into a desired buffer (e.g., from an elution buffer into a final formulation buffer). During UF, molecules in solution are separated based on size using membranes (filters) of different pore sizes. The different pore sizes are notated by their respective molecular weight cutoff (MWCO). Membranes are available in a wide range of pore sizes (5-1000 kD are typical) and surface areas. Membrane pore size is selected based on the size of the target molecule. In general, particles larger than the MWCO will be retained by the membrane, while particles smaller than the MWCO will pass through. For example, if a membrane has an MWCO of 300 kD, particles larger than 300 kD will be retained by the membrane, while particles smaller than 300 kD will pass through. A manufacturer with a 500 kD protein may select a 200 kD MWCO membrane to ensure that the protein is unable to pass through the membrane to waste while water, salts, and/or residual chemicals pass easily through the membrane. During a typical filtration (i.e., dead-end filtration) step, such as sterile filtration of a buffer or product solution, material flow is always perpendicular to the membrane surface. Particles of larger size (e.g., target product, bioburden, etc.) are retained on the filter membrane surface. These larger particles can build up on the membrane surface and clog the filter membrane. To prevent this from happening during ultrafiltration, tangential flow is used. Instead of flowing perpendicular to the filter membrane, the feed stream flows parallel to the membrane surface. This is why UF is also referred to as tangential flow filtration (TFF). Membrane surface area is selected based on the amount of product that is being processed. Even though product is flowing across the membrane surface during UF/DF operations, there is still a protein layer that builds up on the surface of the membrane. Too little total membrane surface area will result in membrane clogging due to protein build-up. However, if the membrane surface area is too high, the hold-up volume, processing time, and cost of membranes all increase. In addition, there is always some product loss in the protein gel layer on the surface of the membrane, so product recovery decreases if the membrane surface area is too large. Therefore, it is important to use an appropriate membrane surface area to achieve optimal conditions. In general, diafiltration is used to change the chemical properties of the retained solution under constant volume. Unwanted particles pass through a membrane while the make-up of the feed stream is changed to a more desirable state through the addition of a replacement solution. In biotechnology, diafiltration is commonly used to prepare the product stream for a chromatography step to exchange drug product into the final formulation buffer, or other situations where higher or lower conductivity/pH levels are required. The setup for diafiltration is identical to the setup for ultrafiltration except the diafiltration buffer is fed to the retentate vessel at the same rate that permeate is leaving the system. Because the solution is entering the system at the same rate as it is exiting the system, the retentate volume stays relatively constant. Diafiltration continues until the desired conditions (e.g., pH, conductivity, residual concentration, etc.) in the retentate vessel are achieved. In the case of conjugated biomolecules, it may be necessary to determine when all of the small molecules are released during the diafiltration. Monitoring the concentration of the retentate during this process can accomplish that task. Development studies are routinely performed to determine the amount of diafiltration solution required to attain the desired endpoint. The methods and devices of the present invention provide for real-time retentate concentration and real-time process control which is independent of buffer conditions. Moreover, the methods and devices of the present invention provide for real-time information without sampling.

The devices and method of the present invention may also be used to determine the "fingerprint" of a particular molecule or particular process. For example, in the case of biosimilars replication of the process for the reference list biological product should result in the same peak shape, purity profile or other parameter. A three dimensional fingerprint of a particular process or product might include plotting the wavelength versus time versus the slope value for that product or process.

EXAMPLES

Example 1—Ultrafiltration Process

Figure 5:
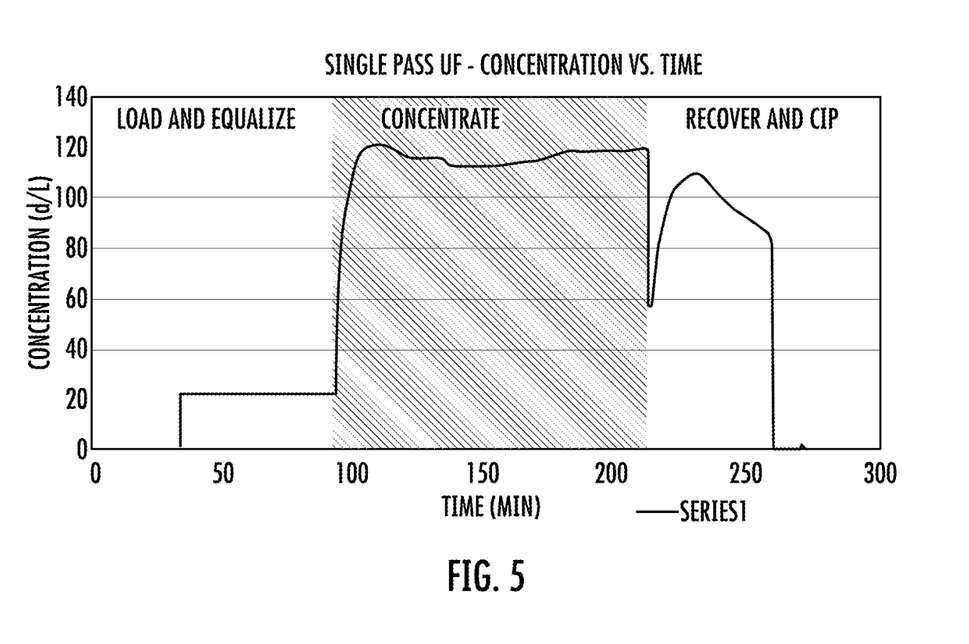
FIG. 5 is a plot of concentration versus time for a single pass ultrafiltration process using the flow cell used in the methods and devices of the present invention.

A single pass ultrafiltration process was utilized to achieve a high concentration factor for a product. The flow cell system was plumbed with a Pall Single Pass UF system in the retentate line and permeate was sent to the retentate vessel until a 5 to 7 times concentration factor was achieved. A starting concentration of 22.5 g/L was concentrated into a concentration of 121 g/L. FIG. 5 shows a plot of single pass ultrafiltration in which the starting concentration of 22.5 g/L was concentrated into a peak concentration of 121 g/L after which a slight dilution in retentate decreases the concentration to 119 g/L.

Example 2—Ultrafiltration Process/Diafiltration/Ultrafiltration Process

Figure 6:
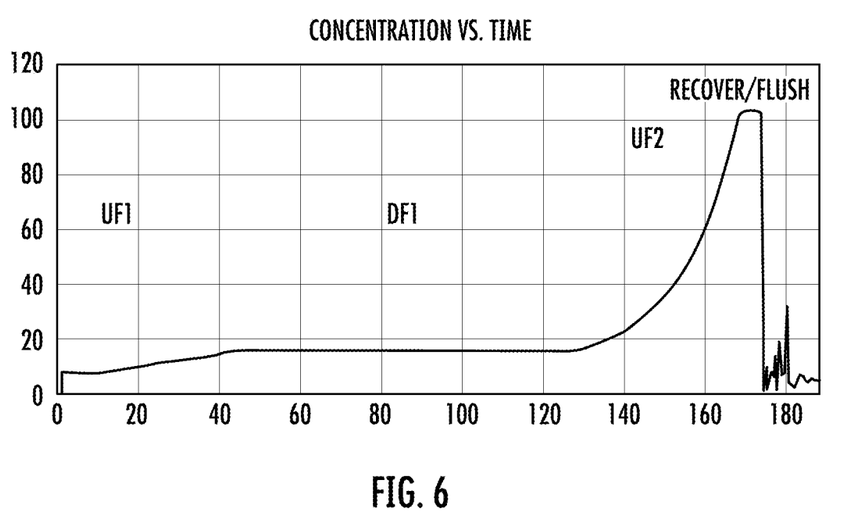
FIG. 6 is a plot of concentration versus time for an ultrafiltration/diafiltration/ultrafiltration process using the flow cell used in the methods and devices of the present invention.
Figure 7:
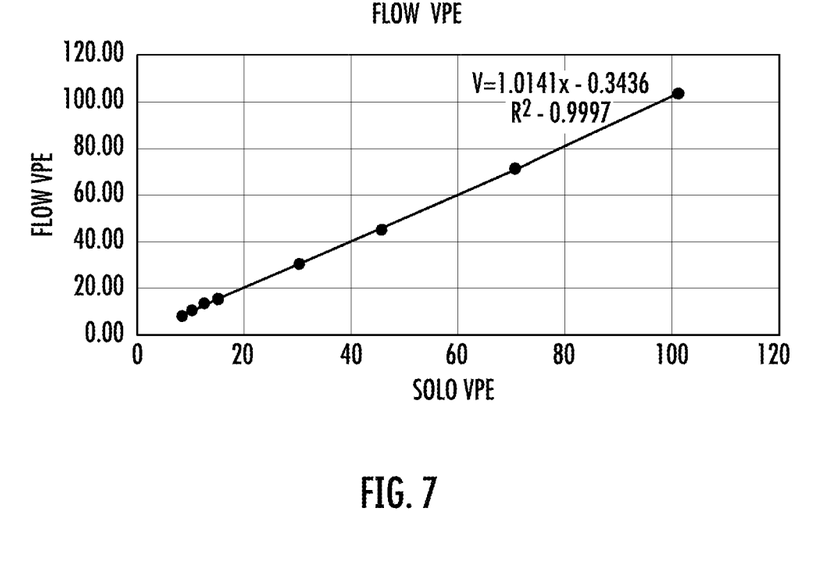
FIG. 7 is a plot that compares the results from a static device versus a continuous flow device for an ultrafiltration/diafiltration process using the flow cell used in the methods and devices of the present invention.

The FlowVPE system was plumbed inline with an outlet of a Poros column on an Akta Avant and the elution peak was monitored using various loading parameters and flow rate to determine changes in peak shape. The standard Akta ultraviolet sensors were unable to detect a signal and thus provided no data. FIG. 6 shows a plot of concentration versus time for an ultrafiltration/diafiltration/ultrafiltration process in which the plot shows an increase of for about 8 mg/ml to over 100 mg/ml. The plot also shows the recover/flush in which only about 5 mg/ml of product is retained. FIG. 7 shows a plot of correlation between a static model (SoloVPE) and the real-time flow model (Flow VPE).

Example 3—Flow Cell Testing

The flow cells of the present invention have been designed to seal in process flow to keep fluid from escaping during sample measurement. In order to characterize the flow cell, testing was done to determine the sealing capacity of the flow cell as designed. A test stand was configured to integrate a flow cell with a flow fibrette installed and loaded into a FlowVPE Head in series with a supply of nitrogen gas. The nitrogen gas was fed into the line that connected with the flow cell, pressurizing the line to 120 psi and testing the various sealing points of the Flow Cell. Over a few 5-6 hour time periods in which the flow cell was pressurized, the flow cell was shown to be able to hold 30 psi by the end of the time period, with higher pressure capabilities in shorter time spans. This shows the Flow Cell to be able to withstand high gas pressures without rapid loss in the short term, and also to be able to hold some internal gas pressure for an extended period of time.

This testing was initiated by a need to verify the sealing qualities of the Flow Cell assemblies after they come off the assembly line at C Technologies, Inc. Two different pressure tests were conducted, the first with nitrogen gas and the second with water. All tests were done with a flow fibrette inserted into the top of the flow cell. Flow cells have good sealing capability for liquids, sealing liquid pressure in excess of 80 psi with no leaking. The tests were performed with the flow cell holding internal pressure for 24 hours, and included flow fibrette actuation in the Flow Cell while the Flow Cell was pressurized, simulating an actual Flow data collection process.

It was observed that a significant amount of material may be deposited on the surfaces of the components that contacted the solution after the flow cell and fibrette were allowed to dry. The material deposited on the surfaces of the flow cell and fibrette may result in transmission losses as large as 4%. To prevent material deposition the flow cell and fibrette may be flushed with de-ionized (Dl) water after being cleaned with NaOH. Exposure to a 1 molar solution of sodium hydroxide (NaOH) on instrument performance was conducted such that the experiment was performed under ambient conditions, or 23° C. and 1 atmosphere, over the duration of 1 week. The results show that the flow cell and fibrette materials are impervious to degradation from exposure to this caustic solution.

Within this disclosure, any indication that a feature is optional is intended provide adequate support (e.g., under 35 U.S.C. 112 or Art. 83 and 84 of EPC) for claims that include closed or exclusive or negative language with reference to the optional feature. Exclusive language specifically excludes the particular recited feature from including any additional subject matter. For example, if it is indicated that A can be drug X, such language is intended to provide support for a claim that explicitly specifies that A consists of X alone, or that A does not include any other drugs besides X. "Negative" language explicitly excludes the optional feature itself from the scope of the claims. For example, if it is indicated that element A can include X, such language is intended to provide support for a claim that explicitly specifies that A does not include X. Non-limiting examples of exclusive or negative terms include "only," "solely," "consisting of," "consisting essentially of," "alone," "without", "in the absence of (e.g., other items of the same type, structure and/or function)" "excluding," "not including", "not", "cannot," or any combination and/or variation of such language.

Similarly, referents such as "a," "an," "said," or "the," are intended to support both single and/or plural occurrences unless the context indicates otherwise. For example "a dog" is intended to include support for one dog, no more than one dog, at least one dog, a plurality of dogs, etc. Non-limiting examples of qualifying terms that indicate singularity include "a single", "one," "alone", "only one," "not more than one", etc. Non-limiting examples of qualifying terms that indicate (potential or actual) plurality include "at least one," "one or more," "more than one," "two or more," "a multiplicity," "a plurality," "any combination of," "any permutation of," "any one or more of," etc. Claims or descriptions that include "or" between one or more members of a group are considered satisfied if one, more than one, or all of the group members are present in, employed in, or otherwise relevant to a given product or process unless indicated to the contrary or otherwise evident from the context.

Where ranges are given herein, the endpoints are included. Furthermore, it is to be understood that unless otherwise indicated or otherwise evident from the context and understanding of one of ordinary skill in the art, values that are expressed as ranges can assume any specific value or subrange within the stated ranges in different embodiments of the invention, to the tenth of the unit of the lower limit of the range, unless the context clearly dictates otherwise.

All publications and patents cited in this specification are herein incorporated by reference as if each individual publication or patent were specifically and individually indicated to be incorporated by reference. The citation of any publication is for its disclosure prior to the filing date and should not be construed as an admission that the present invention is not entitled to antedate such publication by virtue of prior invention.

While this invention has been particularly shown and described with references to example embodiments thereof, it will be understood by those skilled in the art that the various changes in form and details may be made therein without departing from the scope of the invention encompassed by the appended claims.

The invention claimed is:

1. A method of determining the change in concentration of a substance in solution over time comprising:
   continuously monitoring in real time the ultraviolet spectrum of the substance by:
      measuring the spectrum in a flow through mechanism comprising a light source, a pathlength, a fibrette and a detector, wherein the pathlength is dynamically altered by moving the fibrette to a plurality of dynamically variable pathlengths such that multiple measurements of the spectrum are made at the dynamically variable pathlengths between the fibrette and the detector; wherein the pathlength is dynamically altered in response to real time measurements so that samples are measured without dilution or concentration of the sample;
      determining a concentration of the substance based on said measured spectrum;
      comparing the concentration of the substance over time; and
      generating a control signal in response to the comparison, wherein the control signal adjusts a biotechnology process based on changing process conditions indicated by the comparison.

2. The method of claim 1 wherein the concentration of the substance is monitored at more than one location.

3. The method of claim 2 wherein the substance is a virus particle.

4. The method of claim 1 wherein the substance is a surfactant.

5. The method of claim 1 wherein the substance is a biomolecule.

6. The method of claim 5 wherein the biomolecule is a protein.

7. The method of claim 1 wherein the change in concentration of the substance is due to the solution being subjected to a purification process.

8. The method of claim 7 wherein the purification process is precipitation, filtration, electrophoresis, chromatography separation and combinations thereof.

9. The method of claim 8 wherein the chromatographic separation comprises a step selected from the group consisting of anion exchange chromatography, cation exchange chromatography, gel filtration chromatography, hydrophobic interaction chromatography and affinity chromatography.

10. The method of claim 8 wherein the filtration is ultrafiltration or diafiltration or combinations thereof.

11. The method of claim 1, wherein the biotechnology process comprises monitoring a chromatography column, and wherein said control signal reroutes a flow of the substance to an alternative chromatography column when the comparison indicates the concentration of the substance is outside a predetermined range.

12. The method of claim 1, wherein the step of determining the concentration of the substance is performed without knowing the path lengths.

13. A method of determining the change in concentration of a substance in solution over time comprising:
   monitoring in real time the ultraviolet spectrum of the substance at discrete time points by:
      measuring the spectrum in a flow through mechanism comprising a light source, a pathlength, a fibrette and a detector, wherein the pathlength is dynamically altered by moving the fibrette to a plurality of dynamically variable pathlengths such that multiple measurements of the spectrum are made at the dynamically variable pathlengths between the fibrette and the detector at the discrete time points; wherein the pathlength is dynamically altered in response to real time measurements so that samples are measured without dilution or concentration of the sample;
      determining a concentration of the substance based on said measured spectrum;
      comparing the concentration of the substance at the discrete time points; and
      generating a control signal in response to the comparison, wherein the control signal adjusts a biotechnology process based on changing process conditions indicated by the comparison.

14. The method of claim 13 wherein the concentration of the substance is monitored at more than one location.

15. The method of claim 13 wherein the change in concentration of the substance is due to the solution being subjected to a purification process.

16. The method of claim 15 wherein the purification process is precipitation, filtration, electrophoresis, chromatography separation and combinations thereof.

17. The method of claim 16 wherein the chromatographic separation comprises a step selected from the group consisting of anion exchange chromatography, cation exchange chromatography, gel filtration chromatography, hydrophobic interaction chromatography and affinity chromatography.

18. The method of claim 13, wherein the biotechnology process comprises monitoring a chromatography column, and wherein said control signal reroutes a flow of the substance to an alternative chromatography column when the comparison indicates the concentration of the substance is outside a predetermined range.

19. The method of claim 13, wherein the step of determining the concentration of the substance is performed without knowing the path lengths.

20. A method of determining the lifetime of a membrane used in ultrafiltration comprising:
   continuously monitoring in real time the concentration of a substance in a solution that has passed through the ultrafiltration membrane by:
      measuring the ultraviolet spectrum of the substance in a flow through mechanism comprising a light source, a pathlength, a fibrette and a detector, wherein the pathlength is dynamically altered by moving the fibrette to a plurality of dynamically variable pathlengths such that multiple measurements of the spectrum are made at the dynamically variable pathlengths between the fibrette and the detector; wherein the pathlength is dynamically altered in response to real time measurements so that samples are measured without dilution or concentration of the sample;
      determining a concentration of the substance based on said measured spectrum;
      comparing the concentration of the substance over time; and
      generating a control signal in response to the comparison, wherein the control signal adjusts a biotechnology process based on changing process conditions indicated by the comparison.

21. The method of claim 20 further comprising continuously monitoring in real time the concentration of the substance in the solution prior to the solution passing through the ultrafiltration membrane.

22. The method of claim 20, wherein the said control signal reroutes a flow of the substance to an alternative ultrafiltration membrane when the comparison indicates the concentration of the substance is outside a predetermined range.

23. The method of claim 20, wherein the step of determining the concentration of the substance is performed without knowing the path lengths.

* * * * *